(12) United States Patent
Lovell

(10) Patent No.: US 7,216,914 B2
(45) Date of Patent: May 15, 2007

(54) TRUCK BED BOX

(76) Inventor: William John Lovell, 3607 Roger Pl., St. Louis, MO (US) 63116-3630

( * ) Notice: Subject to any disclaimer, the term of this patent is extended or adjusted under 35 U.S.C. 154(b) by 124 days.

(21) Appl. No.: 11/121,729

(22) Filed: May 5, 2005

(65) Prior Publication Data

US 2006/0249970 A1    Nov. 9, 2006

(51) Int. Cl.
*B60R 9/06* (2006.01)
(52) U.S. Cl. .................. 296/37.6; 296/57.1; 224/404
(58) Field of Classification Search ............... 296/57.1, 296/37.6; 224/402, 403, 404
See application file for complete search history.

(56) References Cited

U.S. PATENT DOCUMENTS

| | | | | |
|---|---|---|---|---|
| 4,394,100 A | * | 7/1983 | Sperlich | 410/2 |
| 4,749,226 A | * | 6/1988 | Heft | 296/37.6 |
| 5,568,890 A | * | 10/1996 | Magee et al. | 224/539 |
| 6,174,012 B1 | * | 1/2001 | Saffold | 296/37.6 |
| 6,283,526 B1 | * | 9/2001 | Keough et al. | 296/26.09 |
| 6,467,830 B1 | * | 10/2002 | Cortright | 296/37.6 |
| 6,557,918 B2 | * | 5/2003 | Iafrate et al. | 296/26.11 |
| 6,641,013 B2 | * | 11/2003 | Dise | 224/404 |
| 7,052,071 B2 | * | 5/2006 | Mulder et al. | 296/100.07 |

* cited by examiner

*Primary Examiner*—Dennis H Pedder
*Assistant Examiner*—Melissa A Black
(74) *Attorney, Agent, or Firm*—Grace J. Fishel

(57) ABSTRACT

In combination with a truck bed a low profile storage box. A storage box having an improved security system which engages the interior exposed side of said truck bed. A storage box which can be constructed to serve various needs with such features as; a removable top, a hinged top, plural or singular hinged hatches, removable hatches, locking top and hatches, electric hatch and tailgate locks, support mechanisms for holding a top or hatch open, suitable weather stripping for the hatches and removable top, fixed or removable interior partitions and drawers, a seal mounted to the front which would engage the interior disposed side of the tailgate, access ports to accommodate wiring and/or piping, plate mounted equipment attached to the top of the storage box, openings and/or hardware to secure a load to the top of the storage box, rollers attached to the interior exposed side of the bottom of the storage box, part of the truck bed original design, formed to fit the contours of the truck bed, or insulated to carry refrigerated goods.

5 Claims, 4 Drawing Sheets

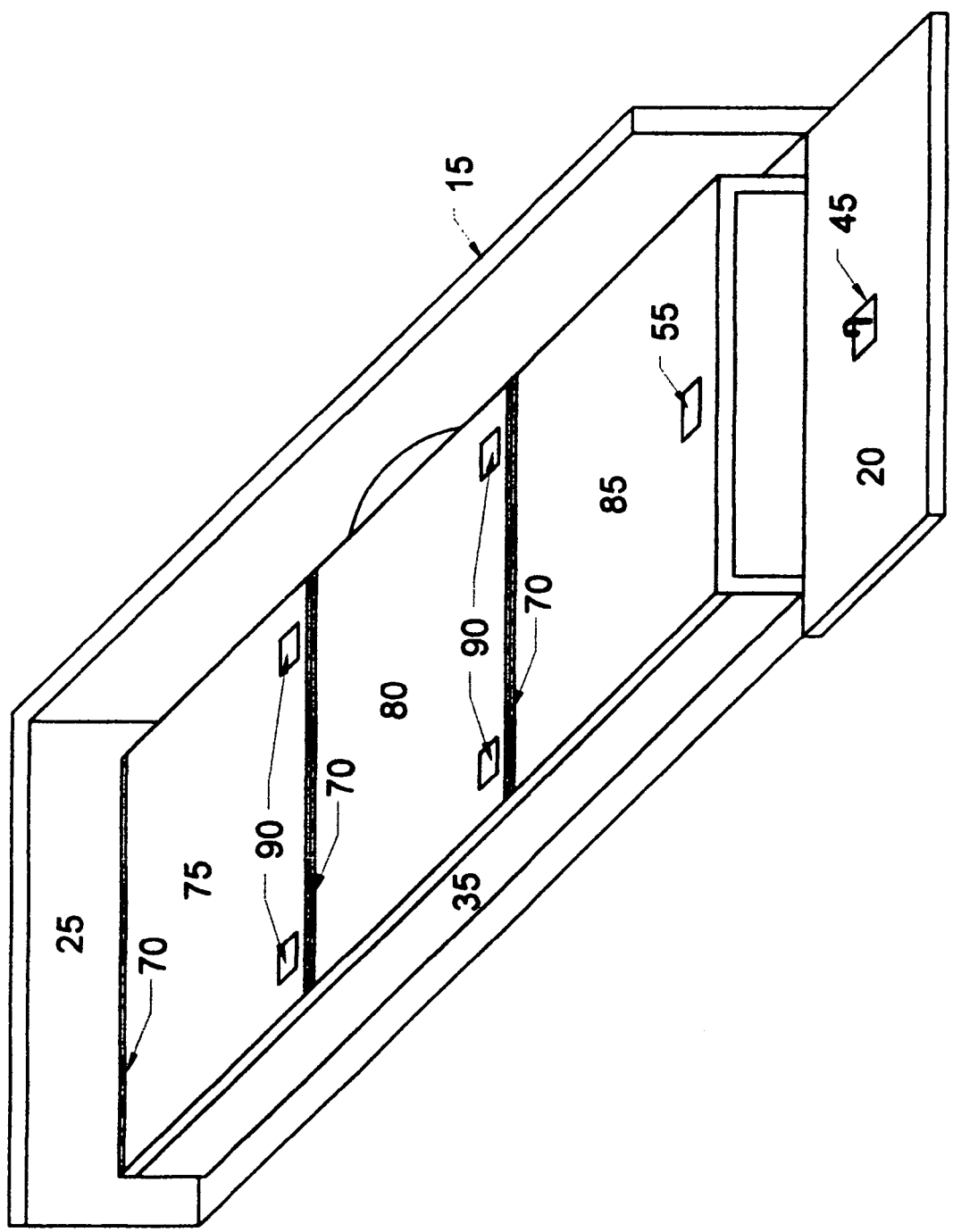

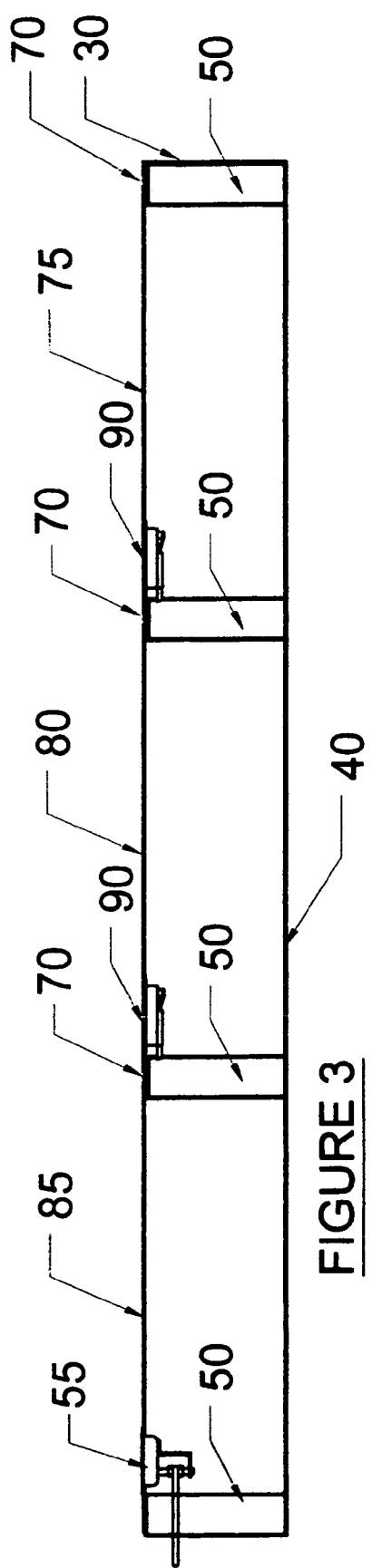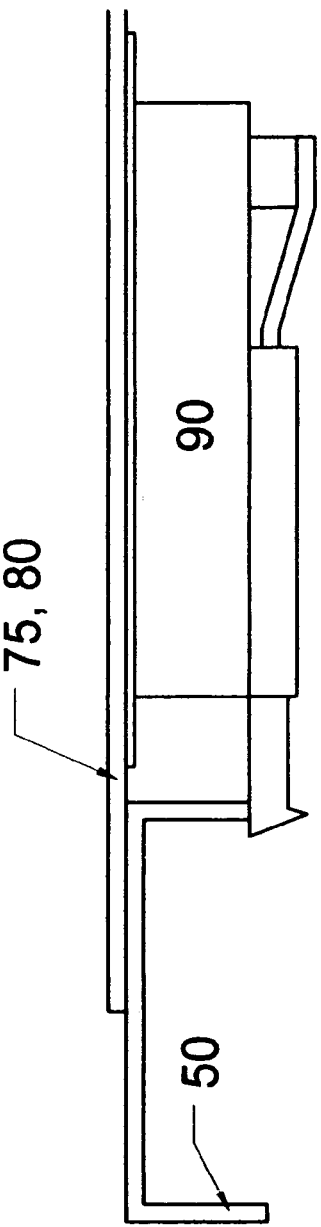

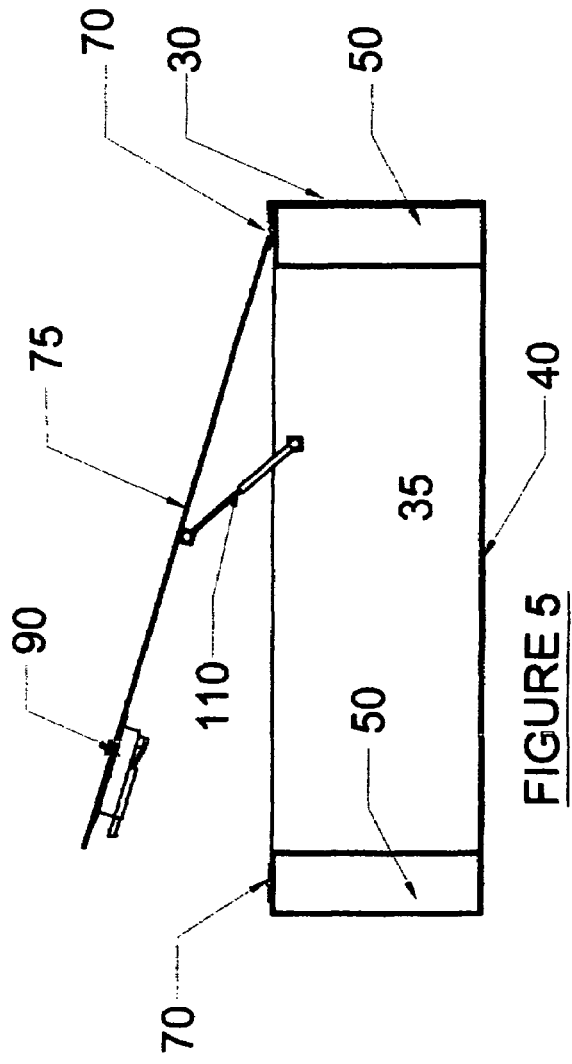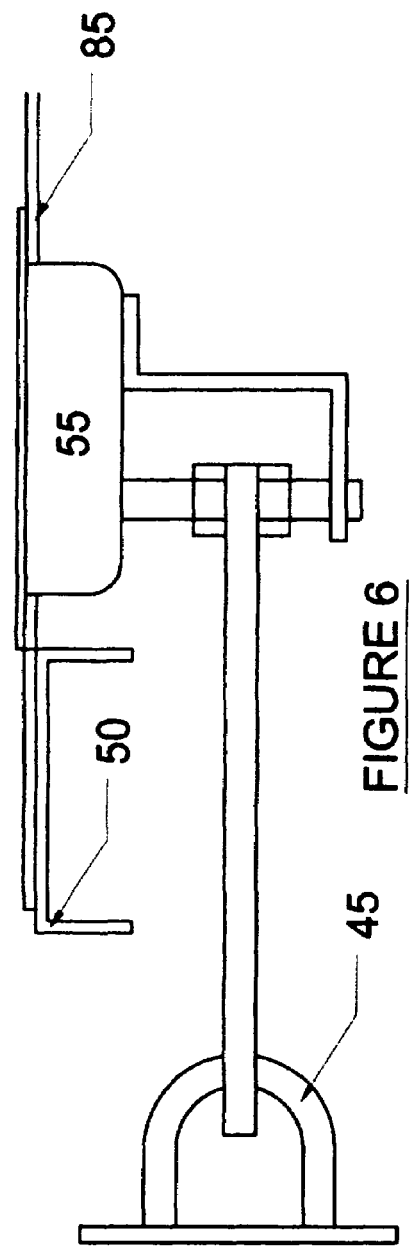

TRUCK BED BOX

The present invention relates to an improved storage system for a truck bed, in particular a pickup truck bed. It is known that the use of prior art to prevent theft diminishes the utility of said truck bed. A popular external tool box which mounts on the top of a pickup truck body panel(s) advertise the presence of equipment and supplies. Said external tool box decreases the length of the truck bed area. Hinged bed covers also attract the attention of the public. These systems limit the amount and configuration of goods to be transported in the truck bed. The present invention, here after known as a truck bed box addresses these problems and provides an improved security system which integrates with the truck's tailgate. In addition said truck bed box offers a platform for such items as a plated mounted crane or a trailer tow ball. An insulated truck bed box could be used in the transportation of temperature sensitive goods. The truck bed box could be part of the original design for a pickup truck bed.

DISCUSSION OF PRIOR ART

A popular external tool box which mounts on the truck body panels and extends the width of a pickup truck bed creates a problem for hauling standard eight (8) foot long construction material. It is not an uncommon sight of a pickup truck having said external tool box transporting a load with the tailgate down and the load extending out of the back of the truck.

KEOUGH, ET AL (U.S. Pat. No. 6,283,526) makes use of a cabinet with a slide out internal drawer. Said cabinet extends the length of the interior of a pickup truck bed. Said slide out internal drawer resides inside of the cabinet on conventional tracks. The slide out internal drawer having a length of the cabinet. During travel a stored item may bounce out of the slide out internal drawer into the cabinet. Retrieval of said item would be difficult. To fully extend the slide out internal drawer a large enough parking area for a pickup truck would have to be found and maintained. Towing a trailer would also hamper the operation of the slide out internal drawer. There is no mention of how to secure the slide out internal drawer from unauthorized entry.

CORTRIGHT (U.S. Pat. No. 6,467,830) employs an external cabinet having an interior storage box which rises out of said cabinet by means of a lift mechanism. Said lift mechanism as suggested might be "a hydraulic cylinder, a scissor jack, screw drive, ratchet and pawl, or any other suitable mechanism" in order to push the weight of said interior storage box, the contents, and any intentional or unintentional (I.e. Snow & Ice) loads resting on the roof panel. There is no mention of how to secure the slide out internal drawer from unauthorized entry.

SUPERRICH (U.S. Pat. No. 4,394,100) employs a sheet of construction material supported by horizontally disposed channels to be permanently mounted on a pickup truck. Said sheet of construction material being the length of the interior of a pickup truck bed. A horizontally disposed channel is attached to the cargo box front wall. An identical horizontally disposed channel is attached to the inward side of a truck tailgate. Stepped support surfaces are on the wheel housing. In the preferred embodiment the sheet of construction material is described as being "a plywood panel having a nominal one inch thickness and a four foot width". When said truck tailgate is closed the rear mounted channel completes four points of support. Having no center support the sheet of construction material may warp if a heavy load is placed on top of said plywood panel. The plywood panel may weaken when exposed to weather.

BRIEF DESCRIPTION OF DRAWINGS

FIG. 2 is a top plan simple view of a pickup truck bed and a Truck Bed Box.

FIG. 3 is a fragmentary side view of said Truck Bed Box.

FIG. 4 is a fragmentary side view of a recessed door lock engaging the body of the Truck Bed Box.

FIG. 5 is a fragmentary side view of a recessed door lock on an open hatch of the Truck Bed Box supported by a gas spring.

FIG. 6 is a fragmentary side view of a recessed curved pawl/cam latch lock engaging a hasp which would be mounted on the tailgate of a pick up truck.

DESCRIPTION OF PREFERRED EMBODIMENT

Figure 1:
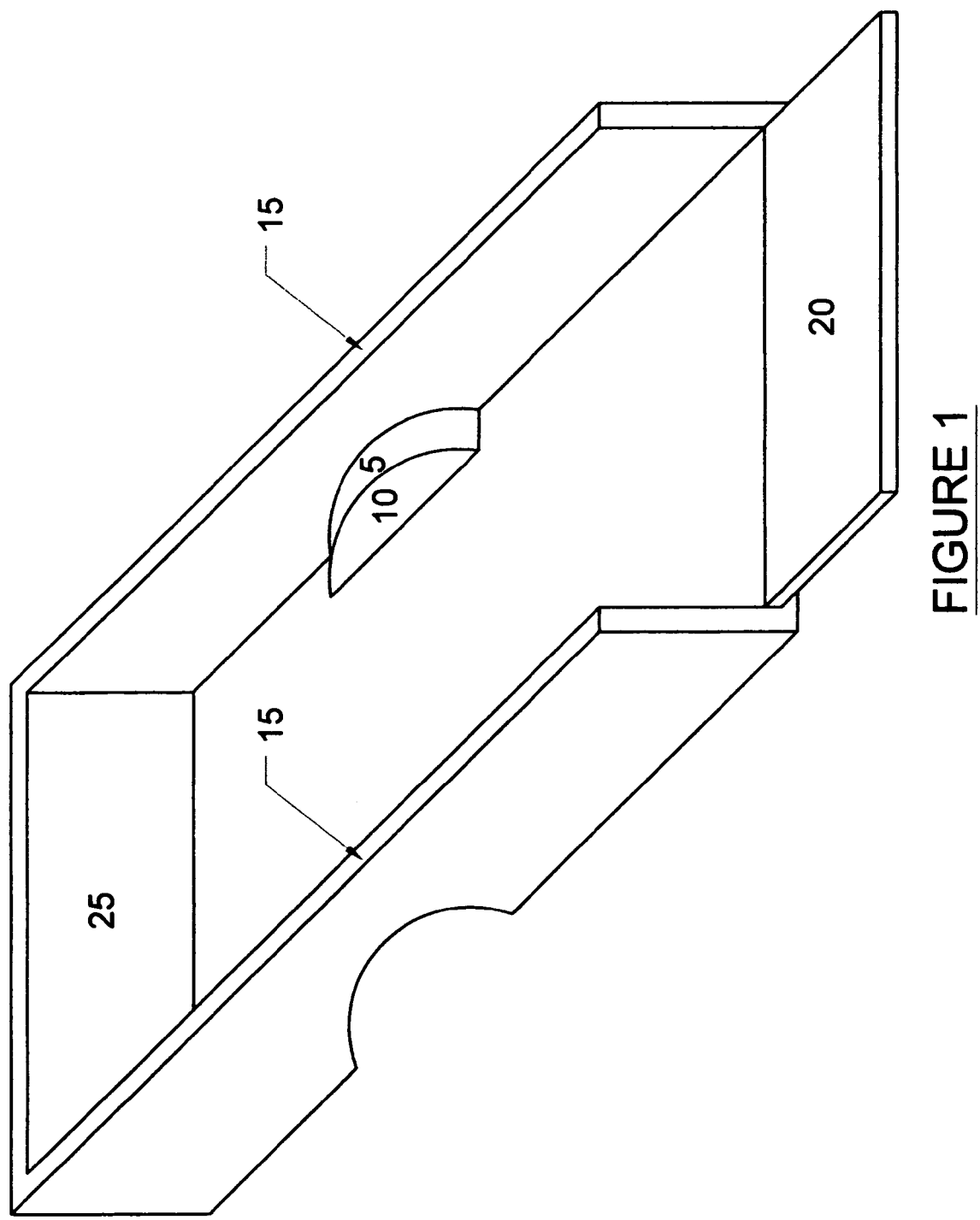
FIG. 1 is a top plan simple view of a pickup truck bed.

Referring to the drawings the dimensions of the present invention, hereafter to be known as a truck bed box, are determined by the dimensions of an intended vehicle. In the preferred embodiment the height of said truck bed box shall be flush with the top of exposed wheel wells (5) of said intended vehicle. Width of the truck bed box being the distance between the interior disposed vertical side (10) of the wheel wells of a truck. In the absence of exposed wheel wells or at the consumers' request height and width of the truck bed box will be determined by the consumer. The maximum height, while maintaining a suitable platform for a lock engaging the truck tailgate (20), being flush with the top of the truck body panels (15). The desired width with use of molded compensation may overlap the exposed wheel wells. The length of the truck bed box being the distance between the interior disposed vertical side of the truck tailgate (20) and the front wall (25) truck bed. In the preferred embodiment the back (30), sides (35), and bottom (40) of the truck bed box are solid but, could be a solid material and/or expanded sheets. The sides (35) and back (30) of the truck bed box could also have openings for wiring or piping. The bottom (40) of the truck bed box could have rollers attached to the interior exposed side to help in maneuvering heavy loads.

In the preferred embodiment the sides (35) of the truck bed box were constructed with aluminum diamond plate. The back (30) and bottom (40) of the truck bed box were constructed with mill aluminum plate. In manufacturing a plastic and/or metal version of the truck bed box could be produced. With regard to a plastic version of the truck bed box, the body could be molded to fit the truck bed contours using vacuum forming techniques.

To facilitate the hinges and lock mechanisms mill aluminum channels were constructed. A section of said channel was attached to the interior disposed side of the truck bed box with the leg of the channel facing out. An identical piece of the channel was attached parallel on the opposite interior disposed side of the truck bed box. A third piece of the channel was attached to the top of the side channels, forming an inverted U support (50). A total of four said inverted U supports (50) were used in this preferred embodiment. The channel leg provides additional benefit of providing a means to attach cargo netting to create a partition within the truck bed box. Solid material and/or expanded sheets would be another option for said partition.

The top of the truck bed box could be solid and/or expanded sheets. A locking mechanism is attached flush to the top of the truck bed box and engages the tailgate of the truck, securing both the truck bed box and the truck tailgate (20). When the lock (55) is engaged, the truck tailgate (20) cannot be lowered and would make it difficult to lift the truck bed box out of the truck bed.

The top of the truck bed box could have access openings and/or hardware to facilitate cargo tie down on top of the truck bed box. The top of the truck bed box could be detachable either partly or as a whole. This flexibility in the top of the truck bed box allows for increased cargo space. In the preferred embodiment a hatch was made of aluminum diamond plate. Said hatch extended the width of the truck bed box and overlap the side (35) to keep the weather out. The inverted U supports (50) were positioned to support the installation of a piano hinge (70) for the hatch. A pivot hinge and hardware can be configured to allow removal of the hatch when desired by the consumer. In the preferred embodiment a total of three hatches were constructed a front (75), a middle (80), and a rear (85) hatch. Hatches having lock mechanisms engaging the interior disposed side of the truck bed and/or the body of the truck bed box. A locking tandem recessed-handle paddle latch (90) was used on said front (75) and middle (80) hatch. The cam (95) of the paddle latch engaging the leg of inverted U support (50). Said rear hatch (85) having a flush mounted a locking curved pawl/cam latch (55) with a T-handle. A padlock eye (45) attached to the interior disposed side (20) of the truck tailgate to be engaged by said curved pawl/cam latch (55). A gas spring (110) was mounted to the interior disposed side (35) of the body of the truck bed storage box and the underside of the hatch (75). The gas spring assists in the opening of the hatch while also holding the hatch open. Said gas spring (110) to be mounted on all hatches.

The preferred embodiment being of solid sheets of aluminum maintains cargo from the weather. To seal the hatch a strip of a gasket material was attached on top of the of the inverted U channel (50). To seal the space between the truck bed box and the interior disposed side of the truck tailgate (20) a strip of gasket material was attached to the exterior exposed side of the inverted U channel (50).

What is claimed is:

1. A truck bed box having a floor upon which are mounted an upstanding back wall and upstanding sidewalls, said floor having a forward end extending to a front wall of a truck bed of a truck and a rearward end extending to a tailgate of the truck, four U-shaped frames formed of an inverted channel material with legs facing inwardly of the truck bed box, a first of said U-shaped frames mounted on the sidewalls over the floor at the forward end of the floor, a fourth of said U-shaped frames mounted on the sidewalls over the floor at the rearward end of the floor, a second and third of said U-shaped frames mounted on the sidewalls over the floor between said first and fourth U-shaped frames, a hatch hingedly attached to each of the first, second and third U-shaped frames, said hatches extending over the sidewalls and forming a top for the truck bed box, said truck bed box further comprising a first recessed paddle latch on each of the hatches attached to the first and second U-shaped frames, each said paddle latch having a cam that latches on one of the legs of an adjoining U-shaped frame, and a locking curved pawl/cam latch on the hatch hingedly attached to the third U-shaped frame that latches into a padlock eye attached to an interior side of the tailgate.

2. The truck bed box of claim 1 wherein a second paddle latch is provided on each of the hatches hingedly attached to the first and second U-shaped frames, said first and second paddle latches being in tandem.

3. The truck bed box of claim 1 further comprising a pair of gas springs for supporting each hatch in open position, said gas springs mounted on the upright sidewalls.

4. The truck bed box of claim 1 for a truck having wheel wells, said top being flush with a top of the wheel wells.

5. The tuck bed box of claim 4 wherein the upwardly extending sidewalls are flush with an inside surface of the wheel wells.

* * * * *